United States Patent
Mortazavian et al.

(10) Patent No.: US 11,694,474 B2
(45) Date of Patent: Jul. 4, 2023

(54) INTERACTIVE USER AUTHENTICATION

(71) Applicant: ONFIDO LTD, London (GB)

(72) Inventors: Pouria Mortazavian, London (GB); Jacques Cali, London (GB)

(73) Assignee: Onfido Ltd., London (GB)

( * ) Notice: Subject to any disclaimer, the term of this patent is extended or adjusted under 35 U.S.C. 154(b) by 874 days.

(21) Appl. No.: 16/667,200

(22) Filed: Oct. 29, 2019

(65) Prior Publication Data
US 2020/0134148 A1 Apr. 30, 2020

(30) Foreign Application Priority Data
Oct. 29, 2018 (EP) .................................. 18203125

(51) Int. Cl.
*G06F 21/32* (2013.01)
*G06T 7/70* (2017.01)
*G06F 17/16* (2006.01)
*G06K 9/62* (2022.01)
*G06V 40/40* (2022.01)

(52) U.S. Cl.
CPC .............. *G06F 21/32* (2013.01); *G06F 17/16* (2013.01); *G06K 9/6267* (2013.01); *G06T 7/70* (2017.01); *G06V 40/45* (2022.01)

(58) Field of Classification Search
CPC ....... G06F 21/32; G06F 17/16; G06K 9/6267; G06T 7/70; G06V 40/45; G06V 40/16
See application file for complete search history.

(56) References Cited

U.S. PATENT DOCUMENTS

| 9,202,105 | B1 | 12/2015 | Wang et al. |
| 10,095,850 | B2* | 10/2018 | Cook ...................... G06F 21/32 |
| 2010/0082345 | A1 | 4/2010 | Wang et al. |
| 2013/0227678 | A1* | 8/2013 | Kang ..................... G06V 40/20 726/19 |
| 2015/0347734 | A1 | 12/2015 | Beigi |

(Continued)

FOREIGN PATENT DOCUMENTS

| EP | 3373202 A1 | 9/2018 |
| WO | 2014169287 A1 | 10/2014 |
| WO | 2017212235 A1 | 12/2017 |

OTHER PUBLICATIONS

Rodrigues et al., Robustness of multimodal biometric fusion methods against spoof attacks, Journal of Visual Languages and computing, 2009.*

(Continued)

*Primary Examiner* — John B Strege
(74) *Attorney, Agent, or Firm* — Cesari & McKenna, LLP (57) ABSTRACT

A computer-implemented method, for verifying an electronic device user, comprising the steps of issuing at least one action instruction to an electronic device user using a notification mechanism of the electronic device; recording response data from a plurality of data acquisition systems of the electronic device, the response data pertaining to the user's response to the at least one action instruction; processing the response data to form classification scores; combining the classification scores to form a classification value; and verifying the user if the classification value satisfies a threshold, wherein each of the at least one action instruction comprises a liveness challenge.

11 Claims, 6 Drawing Sheets

(56) References Cited

U.S. PATENT DOCUMENTS

2020/0311238 A1* 10/2020 Ackerman .............. G06F 21/83

OTHER PUBLICATIONS

"Encyclopedia of Biometrics, Liveness Assurance in Face Authentication ED—Li S Z; Jain A K", Encyclopedia of Biometrics; [Springer Reference], Springer, New York, XP002697617, ISBN: 978-0-387-73002-8, Jan. 1, 2009, pp. 908-915.
Anjos, et al., "Face Anti-spoofing; Visual Approach In: Computer Visioin and Machine Learning with RGB-D Sensors", Springer International Publishing, Cham, XP055377127, ISSN: 2191-6586, ISBNL 987-3-319-08651-4, DOI: 10.1007/978-1-4471-6524-8_4, Jan. 1, 2014, pp. 65-82.
EP18203125.2, "European Examination Report", dated Dec. 23, 2021, 7 pages.
EP18203125.2, "Extended European Search Report", dated Jul. 18, 2019, 13 pages.

* cited by examiner

INTERACTIVE USER AUTHENTICATION

CROSS-REFERENCES TO RELATED APPLICATIONS

This application claims priority to European Patent Application Number 18203125.2, filed Oct. 29, 2018.

FIELD OF THE DISCLOSURE

The present disclosure relates to a method for verifying a user. More specifically, the present disclosure relates to a computer-implemented, challenge-based, multi-factor liveness checking method for verifying a user of an electronic device.

BACKGROUND OF THE INVENTION

Despite significant advances in biometric person identification, user verification based on such identification is inherently susceptible to spoofing attacks that present a copy of a genuine user's biometric data and/or imitate the expected behaviour of the genuine user to masquerade an imposter as a genuine user.

One method to counteract spoofing attacks is to perform a manual check of the liveness of a user of a system. Liveness is a measure of whether a user is a genuine user, i.e. a user interacting with the system without using spoofing means, as opposed to an automated process or a user using spoofing means. An example of such a manual liveness check is when an operator of a service interacts with a user who wishes to register for a service. During the interaction, the operator can verify the liveness of the user, and rule out imposters using spoofing means or an automated program masquerading as a genuine user. Such manual liveness checking is a labour intensive process that must take account of operator availability, users speaking different languages and accents, and the inherent inconsistency of human to human interaction. Therefore, manual liveness checking may lead to errors, processing bottlenecks, and a reduced intake of users.

Automated verification methods with liveness checking aspects have been developed that are less labour intensive, more consistent, and more scalable. These automated verification methods check liveness by verifying the existence of some liveness property. As an example, a verification method may confirm liveness by checking that blinking occurs when performing a facial recognition process. Unfortunately, such liveness checking methods can be spoofed. As an example, a printed image of a genuine user can be wrapped around an imposter's head, as a mask, with eyes holes so the imposter's blinking action can be seen, thus tricking the automated verification method. The problem with such automated verification methods is, therefore, that they are easily spoofed.

Additionally, the measurement of the liveness property that is measured by the automated verification method can be rendered unusable if the local environment adversely affects the measurement. For example, in a noisy environment, it may not be possible to operate a liveness checking process based on automated processing of the speech of a user.

The disclosure provided herein aims to solve the aforementioned problems

BRIEF SUMMARY OF THE INVENTION

The present invention is defined by the independent claims, with further optional features being defined by the dependent claims.

According to a first aspect of the invention there is a computer-implemented method, for verifying an electronic device user, comprising the steps of: issuing at least one action instruction to an electronic device user using a notification mechanism of the electronic device; recording response data from a plurality of data acquisition systems of the electronic device, the response data pertaining to the user's response to the at least one action instruction; processing the response data to form classification scores; combining the classification scores to form a classification value; and verifying the user if the classification value satisfies a threshold, wherein each of the at least one action instruction comprises a liveness challenge. By recording response data from a plurality of data acquisition systems the acquired data is a more accurate representation of the user's response to the at least one liveness challenge, which increases the ability to discern genuine users. The use of a plurality of data acquisition systems means that the method may even use a single liveness challenge, as the response of an electronic device user to even a single liveness challenge will be assessed by multiple data acquisition systems. This means the single liveness challenge results will be equivalent to results from multiple separate liveness challenges assessed on multiple data acquisition systems respectively.

The at least one action instruction may comprise multiple action instructions. The use of multiple action instructions means that anyone attempting a spoofing attack by producing spoof response data will have to put in extra effort to ensure the fake data covers the multiple action instructions. The at least one action instruction may comprise a motion challenge. It is difficult to make convincing fake video data and therefore using a motion challenge makes the method more robust to imposters using spoofing attacks. The at least one action instruction may also, or alternatively, comprise an audio challenge. Combining two different types of challenge means that a producer of fake data has to expend significant effort to ensure that the fake data covers both challenges. The two challenges may relate to a common instruction, which is convenient for users. When only an audio challenge is used, in certain circumstances the user may react in a way that generates expected noises and characteristic movements, as explained below.

The audio challenge may comprise an instruction to say at least one word. The advantage of using a word is that they are more consistently pronounced, which makes it easier to assess if the challenge has been successfully completed. In some aspects, digits may be used since they are easier to verify, especially if the method is to support multiple languages. The at least one word may comprise a series of words. The series of words can be a plausible sentence to make it easier for a user to say. The at least one word may be randomly selected from a group of words, which results in a collection of words that could not be envisaged beforehand, making it harder to produce data for spoofing attacks.

The motion challenge may comprises an instruction to perform at least one motion. The at least one motion may comprises a head motion, and/or may be randomly selected from a group of motions, one of which may be an instruction to look at a camera. The instruction to look at the camera provides a convenient instruction that is easily understood by users and ensures the user's facial features are visible to the camera. Again, the use of a randomly selected motion means the requested motion could not be envisaged beforehand, making it harder to produce data for spoofing attacks. The instruction may be for a user to turn their head to a random direction. The head turn instruction provides a variety of views of the user's head which allows analysis of the 3D structure of the face and makes production of fake samples (e.g. Deep Fakes) more difficult.

The notification mechanism may comprise a speaker of the electronic device and/or a display of the electronic device. The notification mechanism can be adjusted as necessary according to the user's preference or the local environment. The selection of the mechanism to communicate the notification may be automatic, possibly taking the local environment into account. Any mechanism that can confer an action instruction may be considered a notification mechanism.

The plurality of data acquisition systems may comprise a first data acquisition system and a second data acquisition system, wherein the first data acquisition system is different to the second data acquisition system. The plurality of data acquisition system may comprise a video recording system and/or an audio recording system. One advantage of acquiring different data types is that environmental conditions affect different data types differently. Therefore, acquiring different data types makes the method more robust, especially when it is operated in adverse environmental conditions. For example, a very bright room may cause glare that makes recorded video data unusable but the glare will not adversely affect audio data that is recorded at the same time. Acquiring data from different data acquisition systems also means that any weaknesses or failures in one data acquisition system, or its related data, can be mitigated by another system, or data therefrom. The plurality of data acquisition systems may comprise a camera and/or a microphone. Any system that can record a user's response to at least one action instruction may be considered a data acquisition system.

Typically, the response data are recorded in a plurality of memory locations respectively. The plurality of memory locations may be marked with a plurality of flags respectively. For example, the plurality of flags may include at least one video flag marking video data and/or at least one audio flag marking audio data. Recording response data may comprise recording a series of time stamps to mark the start of each of the at least one action instruction. The step of processing the response data to form classification scores may comprise dividing the response data into segments corresponding to the at least one action instruction. This form of memory marking makes the recorded data easy to identify, access, and analyse.

The step of processing the response data to form classification scores may comprise processing the response data to identify the likelihood of at least one characteristic pattern associated with an action instruction. Searching for the presence of at least one characteristic pattern provides an efficient way to assess recorded data.

Processing the response data to identify the likelihood of at least one characteristic pattern associated with an action instruction may comprise processing audio data to assess the classification score of at least one characteristic noise associated with the action instruction. As an example, audio speech recognition on the audio data may be performed, and may result in an audio speech classification score being formed. The resultant audio speech classification score provides a convenient measure of liveness according to the audio data. All described scores may also be the result of binary decisions i.e. 0 or 1.

Optionally, performing audio speech recognition on the audio data comprises: sending audio data to a remote system; processing the data on the remote system; retrieving results of the audio data analysis from the remote system; and forming the retrieved results into an audio speech classification score. The advantage of processing data remotely is that the local processing load at the electronic device at which the user is located is reduced, which is especially important if the electronic device is a battery powered device. Alternatively, the audio speech recognition can be performed on the device, which saves on the bandwidth needed process the data and enables operation when connection to a remote server is not available.

Performing audio speech recognition on the audio data may comprise processing the audio data in a neural network. Optionally, the neural network comprises: an audio encoding module configured to encode the audio data into a feature representation; an attention module configured to predict subword units from the feature representation; and an audio decoding module configured to generate the output sequence from the predicted subword units. This provides a fast, robust and reliable assessment of the audio data.

Processing the response data to identify the likelihood of at least one characteristic pattern associated with an action instruction may comprise processing video data to assess the classification score of at least one characteristic motion associated with the action instruction. Forming a classification score for a motion provides a convenient measure of liveness according to the video data that is easily handled in subsequent analysis.

Processing video data to assess the classification score of at least one characteristic motion associated with the action instructions may comprise at least one of: performing visual speech recognition on the video data and performing facial action recognition on the video data. Visual speech recognition may comprise an assessment of lip synchronisation (lip sync). In other words, verifying that the audio noises correspond to lip movements. The level of correspondence needed may be detection of mere movement of the lips i.e. verifying that the lips moved during a speech challenge. The outcome is that the large volume of video data is reduced to a convenient classification score. The video data may be processed in different ways to interrogate it with regard to different aspects. For example, a video may reveal head motion and mouth motion and both may be considered separately or together when forming one or more classification scores.

Performing visual speech recognition on the video data may comprise forming a visual speech classification score and/or processing parts of the video data to detect at least one region of interest; extracting information relating to the motion or position of at least a part of the at least one region of interest; retrieving information relating to a characteristic motion; comparing the extracted information with the retrieved information; and forming a visual speech classification score. The retrieved information need not be explicitly stored somewhere before retrieval. In other words, the information may be implicitly contained in a model that is used to generate and/or provide the information as required. This provides a robust method to assess whether the video data contains speech, the method operating separately to an audio based assessment of whether or not a video contains speech. Confidence in whether the user has spoken is therefore increased. Additionally, since this method does not use audio data it can be operated in an environment, and/or on a device, in which audio data recording is difficult or impossible.

Performing facial action recognition on the video data may comprise forming a facial action classification score, and/or performing a plurality of head pose estimations on the video data; processing the plurality of head pose estimations to form extracted pose information; and forming a facial action classification score using the extracted pose information. This helps ensure that the image in the video data corresponds to a real person. The forming of the score provides a convenient summary measure of the facial action.

Processing the plurality of head pose estimations to form extracted pose information may comprise: extracting a series of angles from the plurality of head pose estimations; fitting a function to the series of angles; constructing a feature vector from parameters of the function, the fitting of the function, and the head pose estimations; and testing if the video data contains at least one characteristic motion with the feature vector. This a robust and fast method to assess the video data. This method can also be extended to verify that the facial action in fact corresponds to the motion of a 3D face, as opposed to a motion of a 2D facial mask or a printed photograph.

Processing the response data to form classification scores may comprise assessing a quality score for at least one data type. By assigning a quality score, the method can appropriately weight the corresponding data type to account for adverse local effects be they from the device or from the local environment.

The at least one data type preferably comprises video data or audio data. Assessing a quality score for video data may take into account at least one of: frame resolution; video frame rate; colour balance; contrast; illumination; blurriness; the presence of a face (face detection); the visibility of one or more facial parts (e.g. eyes, nose, lips, chin) and glare. Whereas, assessing a quality score of audio data may take into account at least one of: sampling frequency; background noise; and the quality of the sound recording equipment. Of course, other factors may also be considered and any factor that affects the acquired video or audio data may need to be considered when forming the quality score. Combining the classification scores to form a classification value may comprise remapping each classification score to the range of −1 to 1, and/or weighting each classification score by the quality assessment relating to the relevant data type. Remapping rescales the data to allow more convenient combination of the classification scores from different data types. Other ranges may be used if necessary.

Typically, weighting each classification score by the quality assessment relating to the relevant data type comprises: weighting a classification score relating to video data with a quality score for video data; and weighting a classification score relating to audio data with a quality score for audio data. This enables the system to automatically account for local environment or device factors that affect video and audio data differently.

The above methods may notify the user of the electronic device if the classification score satisfies the threshold. If the threshold is not satisfied the user may be prompted to try again, or to try a different method of verification.

In another aspect of the invention, there is a computer-readable medium comprising executable instructions for performing any one of the above-described methods.

According to another aspect of the invention there is a computer comprising a processor configured to execute executable code stored in memory, wherein the executable code comprises instructions for performing any one of the above-described methods.

BRIEF DESCRIPTION OF THE DRAWINGS

The present disclosure is made by way of example only with reference to the accompanying drawings in which.

DETAILED DESCRIPTION OF THE INVENTION

Figure 1:
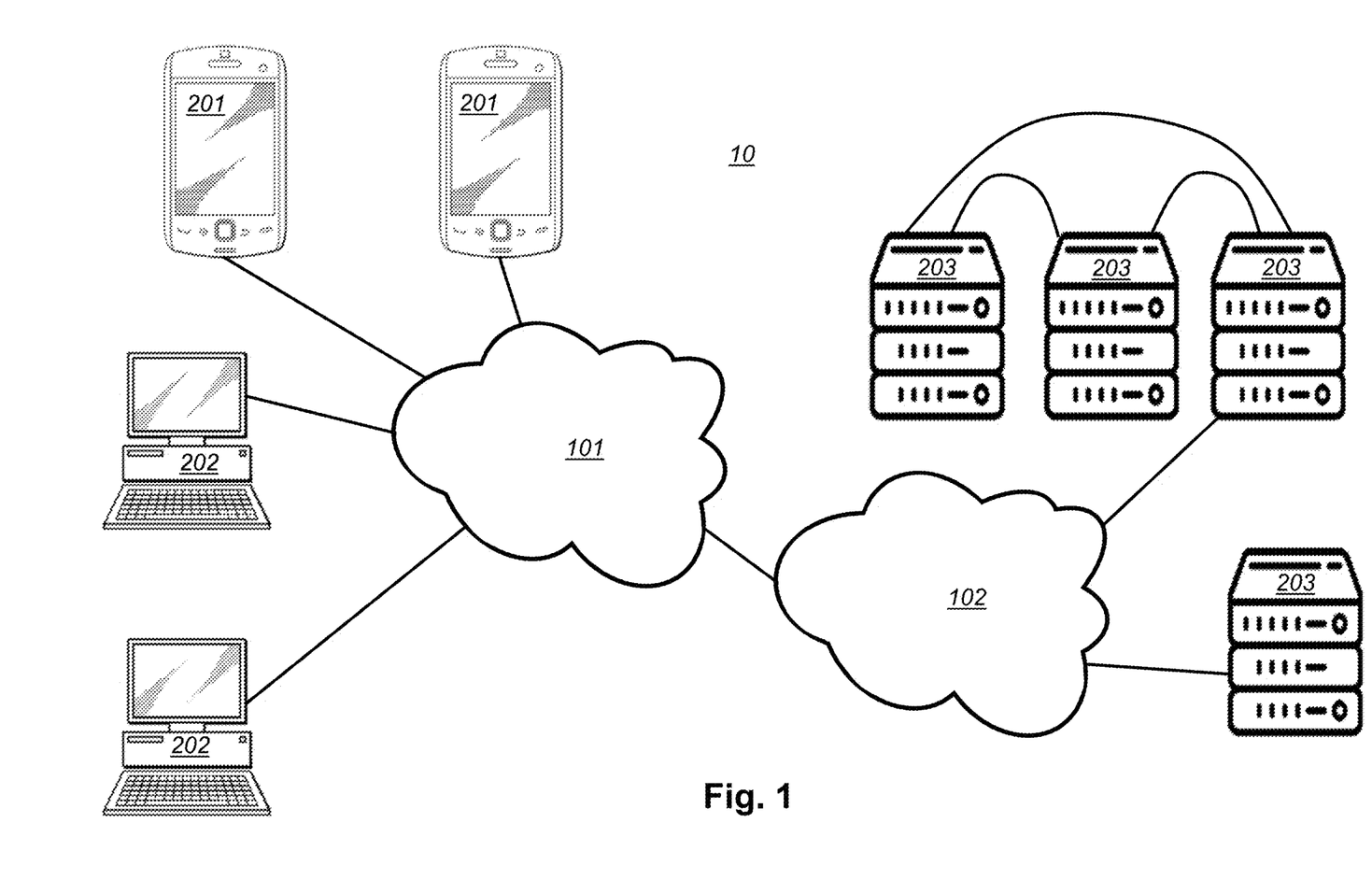
FIG. 1 is a component diagram of a system that may be used to implement the present invention.

FIG. 1 shows a system 10 in which according to one embodiment the invention is implemented. The system comprises electronic devices 201, 202, including mobile electronic devices 201, fixed location electronic devices 202 and servers 203. The electronic devices are in communication with at least one communication network 102 (which may include, but not necessarily include wireless network 101). Data may be communicated between the electronic devices. The at least one communication network may comprise the Internet, The wireless network may for example be a cellular or WiFi communication network, or any other conventionally known wireless communication network. The described network architecture is only exemplary and modifications to it, including removing or adding of network components are possible without affecting the operation of the invention.

Figure 2:
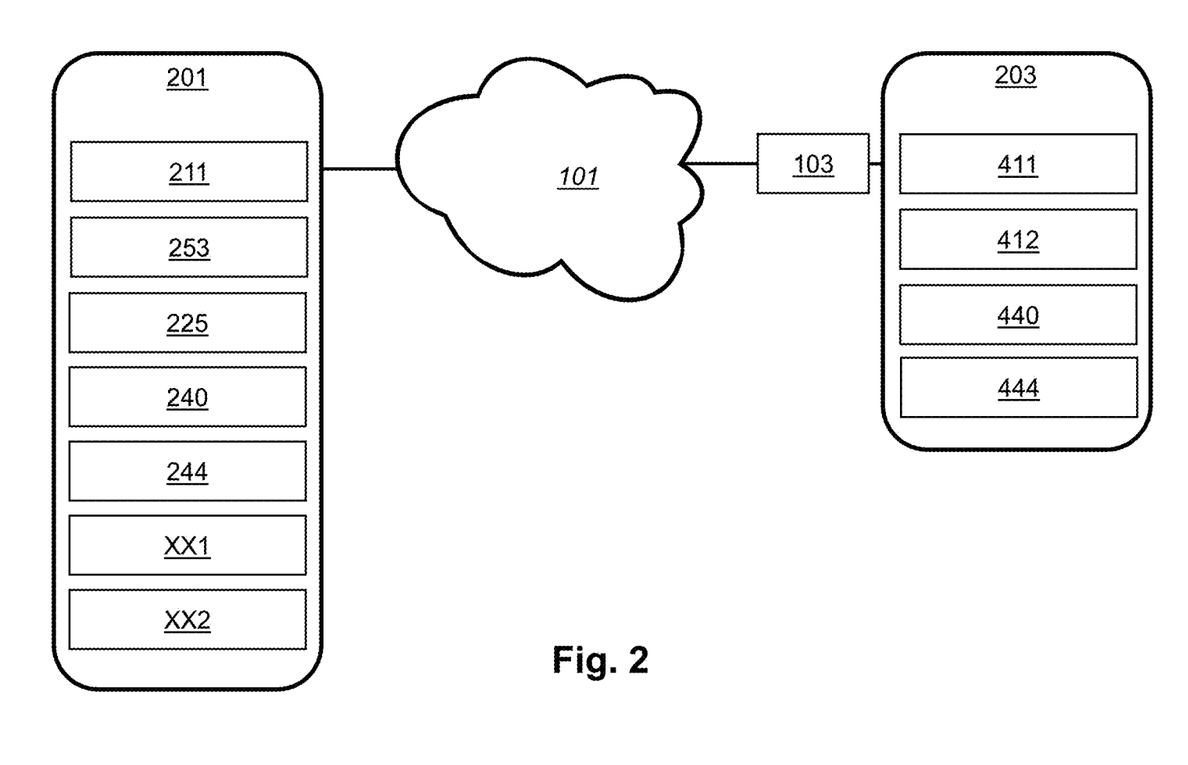
FIG. 2 is a diagram showing components of the system of FIG. 1.

FIG. 2 shows selected aspects of the network system 10 shown in FIG. 1. Specifically, it shows a mobile electronic device 201 in communication, over the wireless network 101, with a server 203. The server 203 is an electronic device that can be accessed across the network 102 by devices 201, 202 to perform computational tasks. The mobile electronic device 201 comprises a communication subsystem 211 to enable communication across the wireless network 101. The mobile electronic device 201 further comprises at least one application 225 that can be executed on a processor 240. The mobile electronic device 201 comprises at least one notification mechanism, such as a display 204, and/or a speaker 256. These particular notification mechanisms are only examples of such notification mechanisms and any other mechanism that that provide information to the user can be considered a notification mechanism. The mobile electronic device 201 also comprises a plurality of data acquisitions systems such as a camera 253 that can be used to acquire image data and a microphone 258 to record local noise. These data acquisition systems are only examples of such data acquisition systems and any other data acquisition system that acquires information relating to the local conditions of the mobile electronic device 201 can be considered a data acquisition system. Applications 255 are stored in memory 244 on the mobile electronic device.

FIG. 2 also shows a server 203 which is connected to the wireless network 101 by a wireless network interface 103 and a network interface 411. The server 203 further comprises applications 412 that can be executed on a processor 440. The server further comprises memory 444 on which the applications 412 and any data that is received from the wireless network 101, and any electronic device connected thereto, can be stored. The server 203 may be distributed and comprise multiple servers, several processors and/or several memory storage locations. Such a distributed server may operate by distributing computational tasks and data across its constituent parts and may communicate with other servers to perform computational operations.

Each of the plurality of data acquisition system may operate when requested by a user or when directed to operate by an application. In some cases, the data acquisition and/or exchange will continuously operate.

The data that are acquired by the plurality of data acquisition system may be stored in memory 244 on the mobile electronic device 201 or in memory 444 in the server 203. In some cases, the data will be stored partially in memory 244 on the mobile electronic device 201 and partially in memory 444 in the server 203. The data may be transferred to and from the mobile electronic device 201 and server 203 as necessary to perform processing directed by an application on the mobile electronic device 201 or server 203. The methods by which data are requested and exchanged between the mobile electronic device 201 and server 203 are well known to a person skilled in the arts. Data may therefore be communicated over the wireless network 101 to the server 203 and stored in the server memory 444. In the server 203, application software of the stored applications 412 executes on the processor 440 similarly to the method explained in the exemplary embodiment below.

Figure 3:
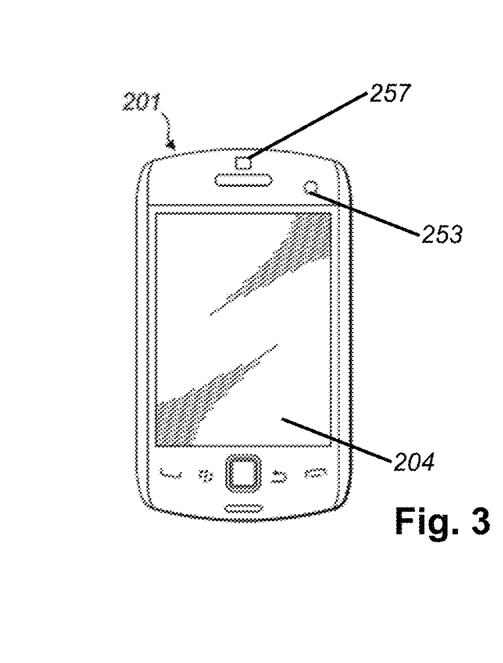
FIG. 3 is a front view of a user electronic device that may operate according to the present invention.
Figure 4:
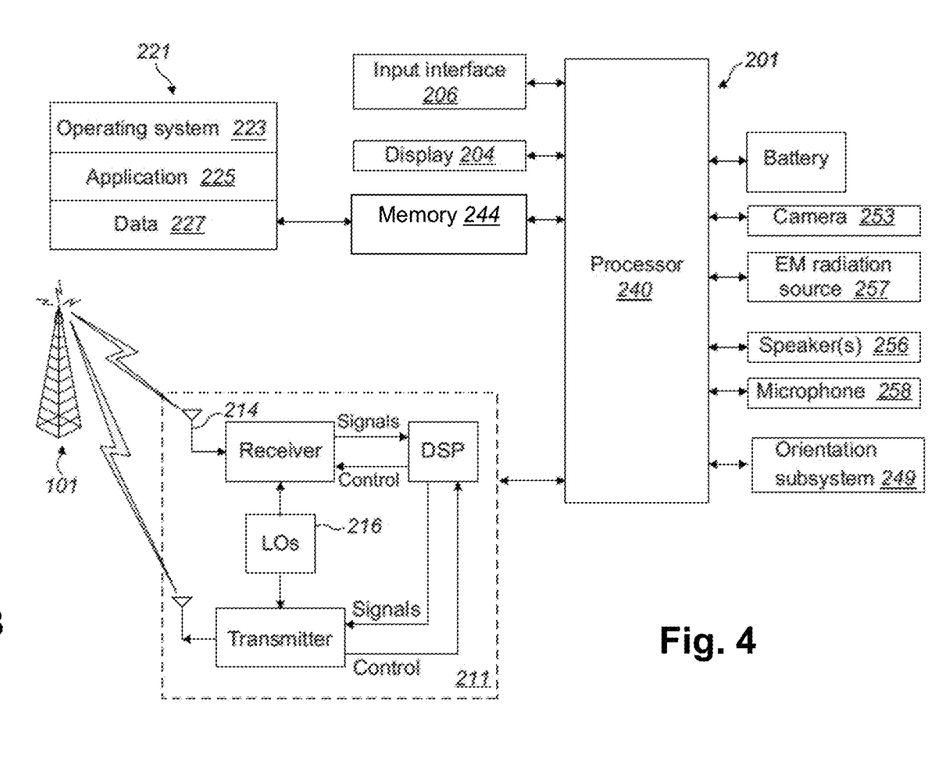
FIG. 4 is a schematic diagram of components of the electronic device of FIG. 3.

FIGS. 3 and 4 provide further details of the mobile electronic device 201 through which a user may work the invention as described herein. The mobile electronic device 201 comprises the display 204, the camera 253, the microphone 258, and an electromagnetic (EM) radiation source 257 suitable for illuminating the area to be imaged with the camera 253 when the ambient illumination is insufficient. The camera 253 may be used to capture image data and the microphone 258 may be used to capture audio data. The result of this assessment may be communicated back across the wireless network 101 to the mobile electronic device 201 and displayed on the display 204 to a user. It will be understood that the system 10 described above is merely an exemplary system for implementing the invention defined herein.

In an example according to the present invention, a user of the above-mentioned mobile electronic device 201 runs an application on the mobile electronic device to verify the user of the electronic device 201. The application controls the speaker 256 and display 204 on the mobile electronic device 201 to issue at least one action instruction each of which may be a liveness challenge. For example, the at least one action instruction may be a motion challenge, such as telling the user to turn their head to one side, or it may be an audio challenge, such as telling the user to say at least one word. The application may further control the camera 253 of the mobile electronic device 201 to record video data and audio data. Dependent on the configuration of the mobile electronic device 201, controlling the camera may include using further data acquisition systems, such as the microphone 258 to record audio data.

Figure 5A:
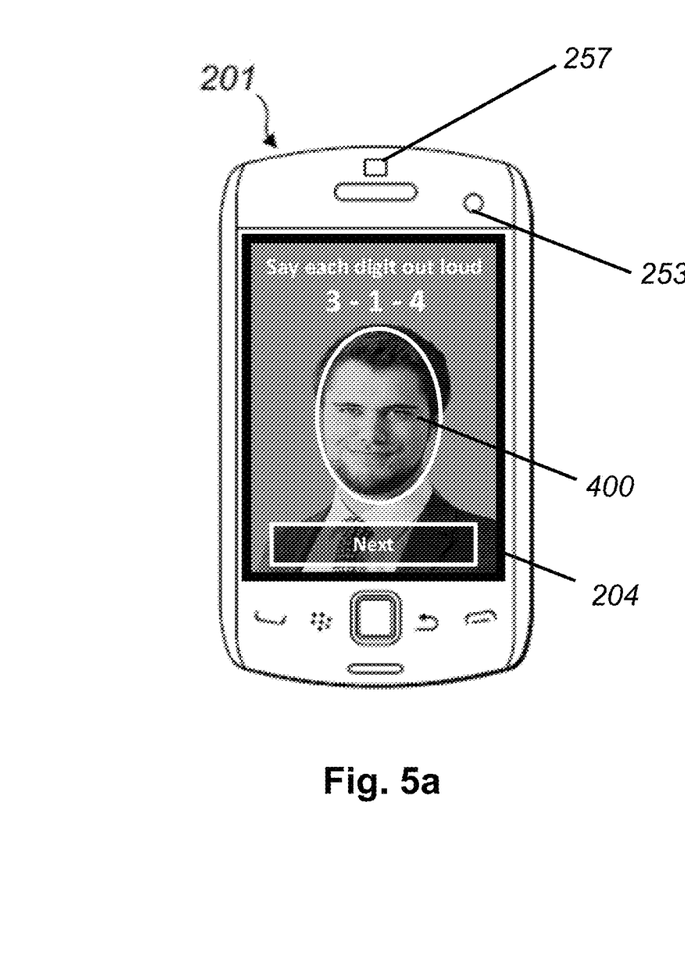
FIGS. 5a and 5b are two exemplary images a user may see during a liveness check according to an embodiment of the present invention.
Figure 5B:
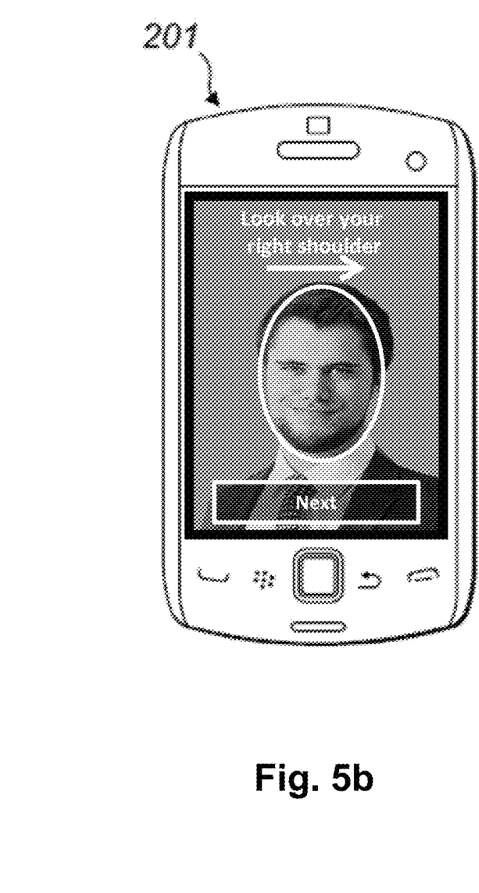

FIG. 5a and FIG. 5b show two simulated screens that an application operating on the mobile electronic device 201 may show on display 204. The screens show two action instructions, each of which is a liveness test, overlaid on an image of the user 400. The first action instruction relates to an audio challenge and states three digits that the user 400 is expected to say. The second action instruction relates to a motion challenge and requests the user 400 to look in a particular direction. Either or both of these instructions can also, or alternatively, be issued via the speaker 256 or any other notification mechanism. The challenges are typically selected to provide complementary information.

In some embodiments, shortly after an action instruction is issued the relevant data acquisition systems start recording data. For the example of the audio challenge, the microphone 258 and camera 253 may both record data to memory 244. However, for the example of the motion challenge, only the camera 253 needs to record data as no response noises are expected from the user 400 in response to the motion challenge.

All data acquisitions systems may operate continuously, or the required data acquisition systems will activate as necessary or for a set timed period around when the relevant response data is expected. In other cases, the user will select, possibly after prompting by an application, to turn on and off the relevant data acquisition systems.

The recorded data from the data acquisition systems will be flagged appropriately to mark the audio data and the video data. The data may be flagged as recorded after particular challenges were issued and/or the timing of the action challenges and data acquisition recorded relatively or absolutely.

Figure 6:
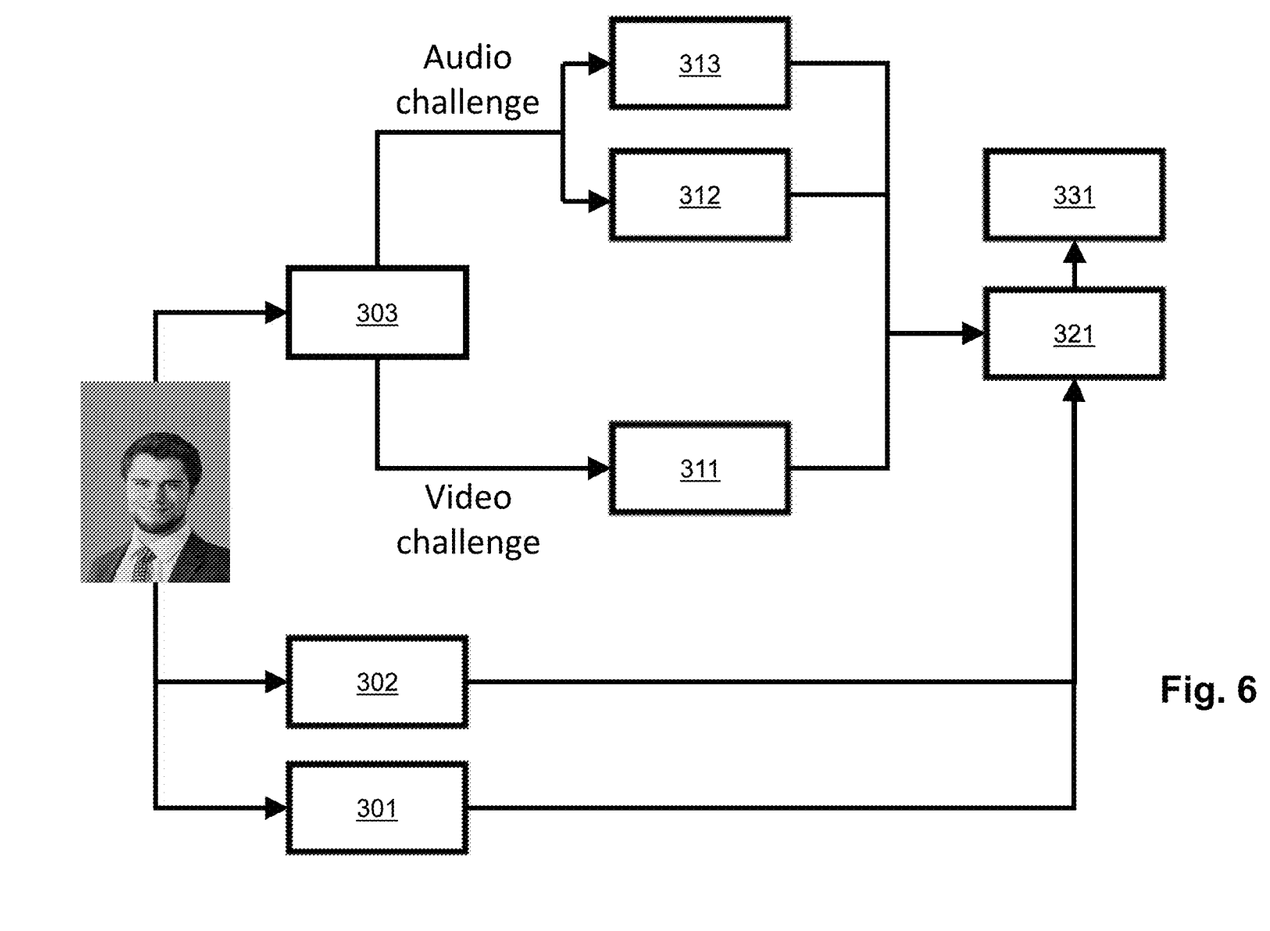
FIG. 6 is a flow diagram of the liveness checking process.

The method shown in the flowchart show in FIG. 6 starts with, after, or during the data acquisition process. The video data undergoes a video quality assessment in a video quality assessment module 301 to produce a video quality assessment score, Qv. The audio data undergoes an audio qualify assessment in an audio qualify assessment module 302 to produce a audio quality assessment score Qa. The video data is then segmented in a video segmenting module 303. In the example shown in FIG. 6 the video data is segmented into two parts each corresponding to one of the motion challenge and the audio challenge. In some embodiments, the video data can be segmented into further parts depending on the number and type of liveness challenges that are issued. Each part of the segmented video data is then passed to the corresponding analysis modules.

In the example shown in FIG. 6, a first part of the video data corresponding to the audio challenge is passed to an audio speech recognition module 313 and a video speech recognition module 312. A second part of the video data corresponding to the motion challenge is passed to the facial action recognition module 311. Each of the modules produce a classification score reflecting the confidence of the given module that the processed data is genuine, which means it is data corresponding to a live user. These classification scores are then combined in a decision making module 321 with the video quality assessment score, Qv, and the audio quality assessment score, Qa, video quality score.

The decision making module 321 outputs a values that can be compared with a threshold. Dependent on the outcome of the threshold, the final step 331 is to declare a pass or a fail.

Normally, all challenges must be completed correctly for the system to verify liveness. However, the decision making can be adapted such that it puts more weight on one or more of the challenges. This may help in adapting to user environments. As an example, when the embodiment shown in FIG. 6 is operated in a noisy environment, verification by audio based means will be more likely to produce errors, so the system can put more weight on the visual means e.g. the visual speech recognition module and the facial action verification module. Similarly, if the acquired video data quality is poor e.g. due to low lighting levels, the system can put more weight on audio speech recognition. Some of the modules are now examined in further detail below.

The video quality assessment module 301 produces the video quality assessment score Qv. Various quality metrics of the video-based response data may be used to assess the risk of error in steps using the video-based response data, such as the visual speech recognition and the facial action recognition. These include metrics accounting for or assessing the: frame resolution; video frame rate; colour balance; contrast levels; illumination; blurriness; specular highlights; the presence of a face; glare; or any factor that can cause a degrading in the quality of the video response data.

The audio data assessment module 302 produces the audio quality assessment score Qa. Various quality metrics on the audio-based response data may be used to assess the risk of error in steps using the audio-based response data, such as the speech recognition. These include metrics accounting for or assessing the: sampling frequency; background noises; the quality of the sound recording; or any factor that can cause a degrading in the quality of the audio response data.

The video segmenting performed by the video segmenting module 303 is an optional step. As one alternative to this step, a complete video without segmentation can be analysed to detect the expected responses to the liveness challenges presented to the user. Typically, in this case, during the capture the one of more timesteps at which the user transitions from the one challenge to another will be recorded. The one or time timesteps are then used during processing to divide the video into sections corresponding to each of the challenges.

One way to implement audio speech recognition module 312, in other words to perform automatic speech recognition, uses a multi-model approach, which comprises using an acoustic model, a pronunciation model, and a language model. The acoustic model would take acoustic features and predict a set of subword units. Next, a hand-designed (in other words, a bespoke optimized) lexicon pronunciation model maps the sequence of phonemes from the acoustic model to words. The language model is then given these words, and as a result the language model will then be able to produce sentences.

A problem with such a multi-model approach is that the constitute models are trained independently which can add a number of complexities to the development. To address this issue, an end-to-end neural net approach may be used. In this case, all of the components are trained at the same time, reducing the complexity of the training regime. Since it is based on a neural framework this also reduces the reliance on hand-designed features. In general, an end-to-end approach was found to provide a significant improvement over the multi-model method. In the end-to-end approach, like the multi-model approach, there are three main components to the system; the listener encoder component (similar to the acoustic model), which takes the time-frequency representation of the input signal XS and encodes this into a higher-level feature representation or feature map FM. This feature map is then passed to an attention mechanism, which is used to predict subword units. The subword units are passed to the decoder mechanism that is essentially the 'speller' that generates the output sequence. Consequently, the neutral net approach is trained end-to-end and all features are learnt.

Turning to the video speech recognition module 312, this module operates in three stages of mouth region of interest (ROI): detection; feature extraction; and classification. In the mouth ROI detection stage, the ROI, e.g. the mouth, is identified in each frame of the analysed video data containing a face. This can be done by fitting an Active Appearance Model, AAM, and detecting the keypoints corresponding to the mouth. In the Feature Extraction stage, visual features are extracted from the ROIs detected in the mouth ROI detection stage in each frame.

Some examples of extracted features include:
AAM-based: An AAM is fitted to the image and the shape and appearance parameters are used as features. Note that this AAM can be either the same AAM used previously, i.e. the face AAM, or a separate mouth AAM;
Discrete Cosine Transform, DCT: DCT coefficients are extracted from the image and used as features;
Local Binary Patterns, LBP: LBP features are texture descriptors widely used in facial image analysis;
Histogram of Oriented Gradients, HOG: Another common feature descriptor; and
Deep features: A deep neural network is used to extract learnt features from the image. An example of this is a feed-forward network and/or a deep auto-encoder with a bottleneck layer where the bottleneck layer provides the features.

The final stage is the classification stage that can either classify individual frames without considering the temporal dynamics or can classify the entire sequence and model the temporal dynamics of the features. Examples of classifiers include:
Support Vector Machines, SVM: This is a simple classifier that ignores the temporal dynamics of the video;
Hidden Markov Model, HMM: HMMs are widely used to model temporal dynamics; and
Long Short Term Memory, LSTM: LSTMs are a type of recurrent neural network widely used for modelling temporal dynamics.

The above description of the video speech recognition module 312 is not an exhaustive list. In each stage, other alternative are also possible. For example, instead of using a single feature in the feature extraction stage, one can use a combination of different features. The feature extraction stage and classification stage can also be combined into an end-to-end network with deep features.

An example of the facial action recognition module 311, which performs the facial action recognition, will now be described. Based on the set of possible actions that the user is challenged to perform, there may be different approaches adopted. In one aspect, the possible actions are limited to the set of rotating the head to the left or right, and possibly also up and down. In this case, head pose estimation may be used to estimate the 3D pose of the face in each frame of the video. A quadratic function may then be fitted to the estimated angles throughout the video. A feature vector may then be constructed from the parameters of the fitted curve, measures of curve smoothness, statistical moments of the estimated poses, and the residuals of the fit. This feature vector is then passed to a classifier which classifies the sequence into a genuine 3D head rotation or a spoofing attempt. In order to extend the system to more actions that the user is challenged to perform, methods similar to the ones described for the visual speech recognition module can be used once they have been trained on suitable data.

Turning to the decision making module 321, the decision making module receives classification scores comprising audio speech recognition classification score Sa from audio speech recognition module 312; video speech recognition classification score Sv1 from video speech recognition module; and facial action recognition classification score Sv2 from facial action recognition module. Each classification score is a value between 0 and 1 and reflects the probability that the observed sample is a genuine sample. The decision making module 321 also receives quality scores comprising the audio quality assessment score Qa and the video quality assessment score Qv. The assessment score is also a value in the range of 0 to 1, with 0 corresponding to a bad quality and 1 corresponding to a good quality. More specifically, if a quality score of a signal (audio or video) is 0, the given signal is too poor for any decision to be made based on the given signal while a quality score of 1 means that the quality of the given signal is good enough for the decision to be completely reliable.

The audio quality assessment score Qa; the video quality assessment score Qv; the audio speech recognition classification score Sa; the video speech recognition classification score Sv1; and the facial action recognition classification score Sv2 are combined into a single score. To combine these values, the classification scores are mapped to a suitable range, this mapping is based on each individual classifier's performance and the desired accuracy. An example of a suitable range is −1 to 1 such that any score below 0 would correspond to the sample being classified as a spoof, if the decision was based on that individual score. A linear combination of the scores is then used. Specifically, each classification score is weighted by the quality assessment score corresponding to the signal on which the decision of the given classifier was based. The fused score is thus given by:

$$S = QaSa + QvSv_1 + QvSv_2$$

More generally, if Na audio-based classifiers and Nv video-based classifiers are used, the fused score will be:

$$S = Qa\sum_{i=1}^{Na} Sa_i + Qv\sum_{j=1}^{Nv} Sv_j$$

where $Sa_i$ is the classification score from the ith audio-based classifier and $Sv_j$ is the classification score from the jth video-based classifier. The final score S will be used to make the final decision. Any S value less than zero will result in the sample being classified as a spoof and any S value greater than zero will accept the score as genuine. Alternative combination of classification scores, such as a Bayesian combination of the classification score may also be used.

Figure 7:
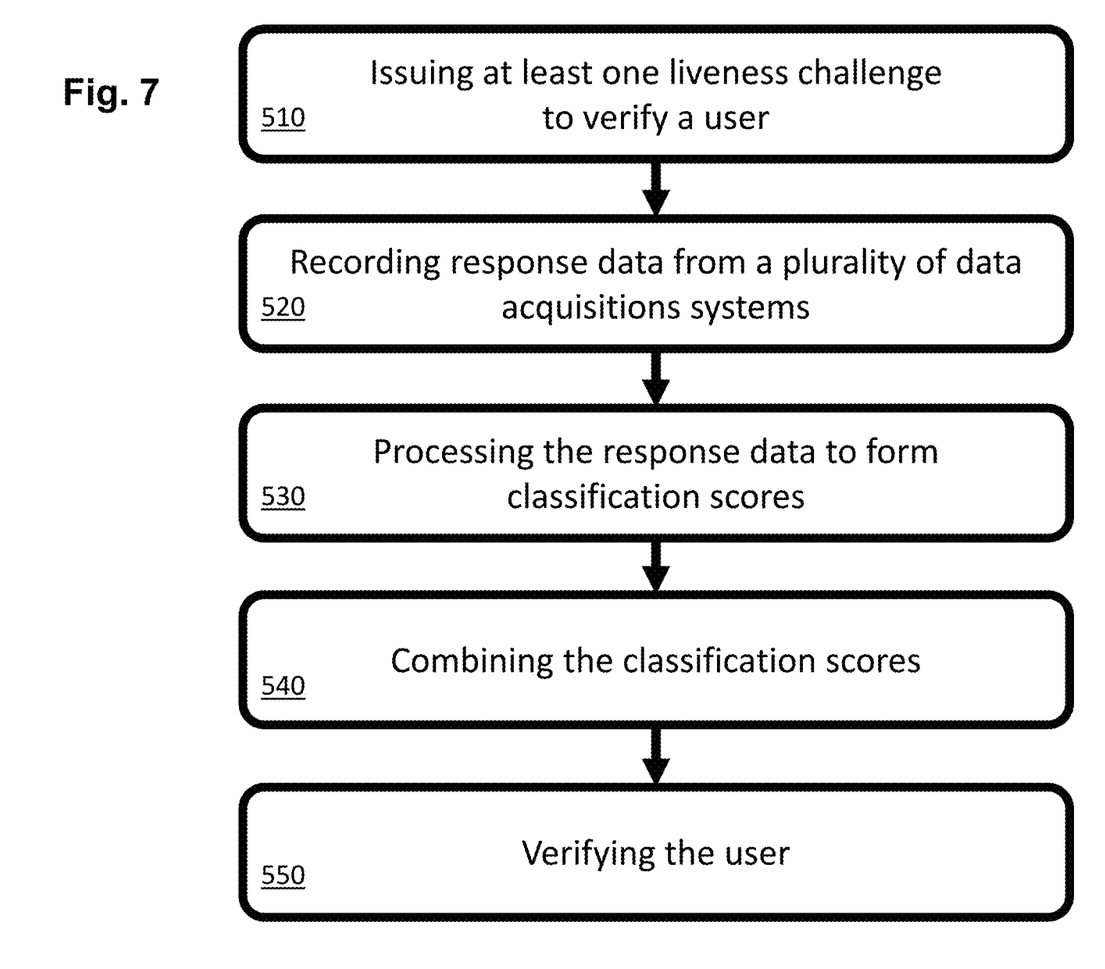
FIG. 7 is a flow diagram of a liveness checking process according to an embodiment of the invention.

As explained above, the verification process described above, and shown in FIGS. 6 and 7, may be at least partially executed by the server 203. The response data in this case would be acquired by one or more electronic devices and submitted to the server 203 for processing. For example response data captured by camera 253 and microphone 258 of mobile electronic device 201 may be communicated to server 203. The mobile electronic device 201 can include an application executable on the device 201 which coordinates the use of the camera 253, the microphone 258 and the communication of the response data and verification result to and from the server 203. The final assessment result may be reported on the display 204 and/or may be recorded by the server 203. A user may therefore work the invention via mobile electronic device 201 or, alternatively, via any other user electronic device that is connected to the wireless network 101.

Such user electronic devices 201, 202 are generally termed communication devices and may be mobile or handheld devices, such as a mobile or handheld communication device. It may also have the capability to communicate with other computer systems; for example, via a data link or network, such as a short-range radio frequency link, e.g. Bluetooth, or via a data network, which may be wireless and/or may be connected to the Internet. In certain embodiments, the user electronic device is a multiple-mode communication device configured for both data and voice communication, a mobile telephone, such as a smartphone, a wearable computer such as a watch, a tablet computer, a personal digital assistant, or a computer system such as a notebook, laptop, or desktop system. The user electronic device may take other forms apart from those specifically listed above, for example a fixed location server or a remotely accessed computer system. The user electronic device may also be referred to as a mobile, handheld or portable communications device, a communication device, or a mobile device. In the context of this disclosure, the term "mobile" means the device is of a size or weight which makes it readily portable by a single individual.

The electronic devices 201, 202 may include a controller including a processor 240 (such a microprocessor) which controls the operation of the electronic device 201, 202 In certain electronic devices, more than one processor is provided, typically, with each processor in communication with each other and configured to perform operations in parallel, so that they together control the overall operation of the electronic device. The processor 240 interacts with device subsystems, such as a wireless communication subsystem 211 for exchanging radio frequency, or microwave frequency, signals with a wireless network 101 to perform communication functions. The processor 240 is communicably coupled with additional device subsystems, some of which are shown on FIG. 4, including: one or more output interfaces 205 (such as one or more of: a display 204, a speaker 256, and an electromagnetic (EM) radiation source 257); one or more input interfaces 206 (such as one or more of: a camera 253, microphone 258, keyboard, control buttons, a navigational input device, and a touch-sensitive overlay) associated with at least one of a touchscreen 204, an orientation subsystem 249, and memory 244 (such as flash memory, random access memory (RAM), read only memory (ROM), etc.); auxiliary input/output (I/O) subsystems; a data port (which may be a serial data port, such as a Universal Serial Bus (USB) data port); an external video output port; a near field communications (NFC) subsystem; a short-range communication subsystem; a clock subsystem; a battery interface; and other device subsystems. Some of the subsystems perform communication-related functions, whereas other subsystems may provide "resident" or on-device functions.

The electronic device 201, 202 stores data 227 in an erasable persistent memory, which in one embodiment is the memory 244. In various embodiments, the data 227 includes service data including information used by the electronic device 201, 202 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, services, applications, games and other commonly stored user information stored on the electronic device 201, 202 by its user. The data 227 may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory) of the electronic device 201, 202 may be organized, at least partially, into one or more databases or data stores.

In at least some embodiments, the electronic device 201, 202 includes a touchscreen which acts as both an input interface 206 (e.g. touch-sensitive overlay) and an output interface 205 (i.e. display). The touchscreen may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some embodiments, the electronic device 201, 202 includes a communication subsystem 211 which allows the electronic device 201, 202 to communicate over a wireless network 101. The communication subsystem 211 includes a receiver, a transmitter, and associated components, such as one or more antenna elements 214, local oscillators (LOs) 216, and a processing module such as a digital signal processor (DSP) 217 which is in communication with the processor 240. The antenna elements 214 and 215 may be embedded or internal to the electronic device 201, 202 and a single antenna may be shared by both receiver and transmitter. The particular design of the wireless communication subsystem 211 depends on the wireless network 101 in which electronic device 201, 202 is intended to operate.

In at least some embodiments, the electronic device 201, 202 also includes a device orientation subsystem 249 including at least one orientation sensor which is connected to the processor 240 and which is controlled by one or a combination of a monitoring circuit and operating software. The orientation sensor detects the orientation of the electronic device 201, 202 or information from which the orientation of the electronic device 201, 202 can be determined, such as acceleration. An orientation sensor may generate orientation data which specifies the orientation of the electronic device 201, 202.

The electronic device 201, 202 includes a microphone 258 or one or more speakers. In at least some embodiments, the electronic device 201, 202 includes a plurality of speakers 256. Each speaker 256 may be is associated with a separate audio channel. The multiple speakers may, for example, be used to provide stereophonic sound (which may also be referred to as stereo).

The electronic device 201, 202 may also include one or more cameras 253. The one or more cameras 253 may be capable of capturing images in the form of still photographs or, preferably, motion video. In at least some embodiments, the electronic device 201, 202 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201, 202 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201, 202 or the housing of the electronic device 201, 202. In such embodiments, the direction of capture of the camera is always predictable relative to the display 204 or the housing. In at least some embodiments, the camera may be provided in a central location relative to the display 204 to facilitate image acquisition of a face. A back facing camera may be used alternatively to, or in addition to, in some embodiments.

In at least some embodiments, the electronic device 201, 202 includes an electromagnetic (EM) radiation source 257. In at least some embodiments, the EM radiation source 257 is configured to emit electromagnetic radiation from the side of the electronic device which is associated with a camera 253 of that electronic device 201, 202. For example, where the camera is a front facing camera 253, the electronic device 201, 202 may be configured to emit electromagnetic radiation from the front face of the electronic device 201, 202. That is, in at least some embodiments, the electromagnetic radiation source 257 is configured to emit radiation in a direction which may visible by the camera. That is, the camera 253 and the electromagnetic radiation source 257 may be disposed on the electronic device 201, 202 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. In at least some embodiments, the camera 253 is configured to capture at least some electromagnetic radiation which is not in the visible spectrum.

The electronic device 201, 202 also includes a battery 238 as a power source, which is typically one or more rechargeable batteries that may be charged. The processor 240 operates under stored program control and executes software modules 221 stored in memory such as persistent memory; for example, in the memory 244. The software modules 221 include operating system software 223 and other software applications 225.

The electronic device 201, 202 processor 240 is configured to execute executable code stored in memory, wherein the executable code comprises instructions for performing the method of the present invention. The code can be stored in any suitable memory.

The electronic device 201, 202 can be supplied with the code preinstalled. Alternatively, the code can be loaded by the user or others on to the phone in the ways that are known to the skilled person, such as by data transfer through a USB cable or by downloading the code via a wireless communication Preinstalling or loading the code is equivalent to installing the code. Preferably, the code is in the form of an application. The application can be provided by a third party application providing service, as is common on modern electronic devices. Code updates may be loaded on to the electronic devices in a similar manner.

The code may operate by contacting one or more external systems, such as a server 203, and exchanging data with the external systems. This prevents all the processing, or calculations, having to occur on the electronic device 201, 202 which is useful to spare processing load and thus battery power. The electronic device 201, 202 may use one preferred communication method to exchange data or it may select the optimal communication method in light of those that are available, The selection of communication methods can be adaptive or responsive. By way of non-limiting example, if a wireless network communication signal using the IEEE 802.11 standard (WiFi) is initially available but lost, as the electronic device moves out of WiFi range, the electronic device may switch to a wireless network communication signal using the CDMA200 standard (3G) to continue the data exchange with the server 203. The data may be seamlessly transferred without interruption or the data transfer may pause during the switch over and be restarted thereafter either automatically or by the user.

In some embodiments, all the processing can occur on a user electronic device to prevent the need to contact external systems. This is especially useful if the user electronic device is a portable electronic device that may move into area in that is outside of all useful communications networks, since the functionality of the method is then not dependent of the availability of a communication network. In some cases, the execution of the code may cause the user electronic device to ascertain whether or not a communications network is available and select the operation mode accordingly, the assessment may be ongoing, periodic, or occur a limited number of times.

The code may provide flags, signals, or indications to other applications or services that the user electronic device is equipped with the extra functionality afforded by the present invention. Additionally, the code may be accessible by other applications or services to provide its functionality within the other application and services. For example, once installed the code may flag a financial application that extra security features are installed. The financial application may thus unlock, or enable, more sensitive functions and execute the code, to increase security, when these features are used. An exemplary use of code, which executes in accordance with the present invention, is described below.

Consider a user who wishes to register for a secure service, which requires registered users to be verified, this can be achieved via an application (or webpage) accessed via electronic device 201, 202. The application uses one or more elements of a software development kit (SDK) to run methods according to the present invention. When the application is accessed it directs the user to enter their details at which point the verification and liveness checking begins by issuing the instruction, via display 204 and speaker 256, to look at the camera 253 and say three digits e.g. "3", "1", and "4". The camera 253 and microphone 258 record the reaction of the user to this instruction. Subsequently, the instruction "to look to the left" is issued via display 204 and speaker 256. The camera 253 records the reaction of the user to this instruction. The response data, acquired from the camera 253 and microphone 258, is processed by the above mentioned verification method. If the user is considered to be live, the result is then communicated to the user and to the service. The service can then proceed to register the new user.

If the server 203 had decided that the response data was not sufficient to verify the user, in other words to confirm the user was not a live user, the server 203 may provide information to alert the service and/or the user. It may request further steps be undertaken by the user or the steps may be started automatically. As an example, a failed verification may result in the user being prompted to repeat the process or issued with further different action instructions so that an enhanced version of the verification process can be carried out. In another example, the user is simply rejected without final action.

Additional methods to verify the user, such as calling the user to conduct a telephone interview, may also be performed to increase confidence in the result reported by the security application.

The following is a list of aspects of the disclosure, and forms part of the description. The aspects are:

1. A computer-implemented method, for verifying an electronic device user, comprising the steps of:
    issuing at least one action instruction to an electronic device user using a notification mechanism of the electronic device;
    recording response data from a plurality of data acquisition systems of the electronic device, the response data pertaining to the user's response to the at least one action instruction;
    processing the response data to form classification scores;
    combining the classification scores to form a classification value; and
    verifying the user if the classification value satisfies a threshold,
    wherein each of the at least one action instruction comprises a liveness challenge.
2. The method of aspect 1, wherein at least one action instruction comprises multiple action instructions.
3. The method of aspect 1 or 2, wherein at least one action instruction comprises a motion challenge.
4. The method of any preceding aspect, wherein at least one action instruction comprises an audio challenge and a motion challenge.
5. The method of aspect 4, wherein the audio challenge comprises an instruction to say at least one word.
6. The method of aspect 5, wherein the at least one word comprises a series of words.
7. The method of aspect 5 or 6, wherein the at least one word is randomly selected from a group of words.
8. The method of any one of aspect 4 to 7, wherein the motion challenge comprises an instruction to perform at least one motion.
9. The method of aspect 8, wherein at least one motion comprises a head motion.
10. The method of aspect 8 or 9, wherein at least one motion is randomly selected from a group of motions.
11. The method of any preceding aspect, wherein the at least one action instruction comprises an instruction to look at a camera.
12. The method of any preceding aspect, wherein the notification mechanism comprises a speaker of the electronic device.
13. The method of any preceding aspect, wherein the notification mechanism comprises a display of the electronic device.
14. The method of any preceding aspect, wherein the plurality of data acquisition systems comprises a first data acquisition system and a second data acquisition system, wherein the first data acquisition system is different to the second data acquisition system.
15. The method of any preceding aspect, wherein the plurality of data acquisition systems comprises a video recording system.
16. The method of aspect 15, wherein the video recording system comprises a camera.
17. The method of any preceding aspect, wherein the plurality of data acquisition systems comprises an audio recording system.
18. The method of aspect 17, wherein the plurality of data acquisition systems comprises a microphone.

19. The method of any preceding aspect, wherein the response data are recorded in a plurality of memory locations respectively.
20. The method of aspect 19, wherein the plurality of memory locations are marked with a plurality of flags respectively.
21. The method of aspect 20, wherein the plurality of flags includes at least one video flag marking video data.
22. The method of aspect 20 or 21, wherein the plurality of flags includes at least one audio flag marking audio data.
23. The method of any preceding aspect, wherein recording response data comprises recording a series of time stamps to mark the start of each of the at least one action instruction.
24. The method of any preceding aspect, wherein the step of processing the response data to form classification scores comprises dividing the response data into segments corresponding to the at least one action instruction.
25. The method of any preceding aspect, wherein the step of processing the response data to form classification scores comprises processing the response data to identify the likelihood of at least one characteristic pattern associated with an action instruction.
26. The method of aspect 25, wherein processing the response data to identify the likelihood of at least one characteristic pattern associated with an action instruction comprises processing audio data to assess the classification score of at least one characteristic noise associated with the action instruction.
27. The method of aspect 26, wherein processing audio data to assess the classification score of at least one characteristic noise associated with the action instructions comprises performing audio speech recognition on the audio data.
28. The method of aspect 27, wherein performing audio speech recognition on the audio data comprises forming an audio speech classification score.
29. The method of aspect 27 or 28, wherein performing audio speech recognition on the audio data comprises:
sending audio data to a remote system;
processing the data on the remote system;
retrieving results of the audio data analysis from the remote system;
forming the retrieved results into an audio speech classification score.
30. The method of any one of aspects 27 to 29, wherein performing audio speech recognition on the audio data comprises processing the audio data in a neural network.
31. The method of aspect 30, wherein the neural network comprises:
an audio encoding module configured to encode the audio data into a feature representation;
an attention module configured to predict subword units from the feature representation; and
an audio decoding module configured to generate the output sequence from the predicted subword units.
32. The method of any one of aspects 25 to 31, wherein processing the response data to identify the likelihood of at least one characteristic pattern associated with an action instruction comprises processing video data to assess the classification score of at least one characteristic motion associated with the action instruction.
33. The method of aspect 32, wherein processing video data to assess the classification score of at least one characteristic motion associated with the action instructions comprises at least one of:
performing visual speech recognition on the video data; and
performing facial action recognition on the video data.
34. The method of aspect 33, wherein performing visual speech recognition on the video data comprises forming a visual speech classification score.
35. The method of aspect 33 or 34, wherein performing visual speech recognition on the video data comprises
processing parts of the video data to detect at least one region of interest;
extracting information relating to the motion or position of at least a part of the at least one region of interest;
retrieving information relating to a characteristic motion;
comparing the extracted information with the retrieved information; and
forming a visual speech classification score.
36. The method of any one of aspect 33 to 35, wherein performing facial action recognition on the video data comprises forming a facial action classification score.
37. The method of any one of aspect 33 to 36, wherein performing facial action recognition on the video data comprises:
performing a plurality of head pose estimations on the video data;
processing the plurality of head pose estimations to form extracted pose information; and
forming a facial action classification score using the extracted pose information.
38. The method of aspect 37, wherein processing the plurality of head pose estimations to form extracted pose information comprises:
extracting a series of angles from the plurality of head pose estimations;
fitting a function to the series of angles;
constructing a feature vector from parameters of the function, the fitting of the function, and the head pose estimations; and
testing if the video data contains at least one characteristic motion with the feature vector.
39. The method of any preceding aspect, wherein the step of processing the response data to form classification scores comprises assessing a quality score for at least one data type.
40. The method of aspect 39, wherein at least one data type comprises video data.
41. The method of aspect 40, wherein assessing a quality score for video data takes into account at least one of:
frame resolution;
video frame rate;
colour balance;
contrast;
illumination;
blurriness;
the presence of a face; and
glare.
42. The method of any one of aspect 39 to 41, wherein at least one of the data type comprises audio data.
43. The method of aspect 42, wherein assessing a quality score of audio data takes into account at least one of:
sampling frequency;
background noise; and
the quality of the sound recording equipment.

44. The method of any preceding aspect, wherein combining the classification scores to form a classification value comprises remapping each classification score to the range of −1 to 1.
45. The method of any preceding aspect, wherein combining the classification scores to form a classification value comprises weighting each classification score by the quality assessment relating to the relevant data type.
46. The method of aspect 45, wherein weighting each classification score by the quality assessment relating to the relevant data type comprises:
    weighting a classification score relating to video data with a quality score for video data; and
    weighting a classification score relating to audio data with a quality score for audio data.
47. The computer-implemented method of any preceding aspect, wherein the user of the electronic device is notified if the classification score satisfies the threshold.
48. A computer-readable medium comprising executable instructions for performing the method of any one of the preceding aspects.
49. A computer comprising a processor configured to execute executable code stored in memory, wherein the executable code comprises instructions for performing the method of any one of the preceding aspects.

The present invention has been described above by way of example only, and modifications of detail may be made which fall within the scope of the invention which is defined by the appended aspects.

What is claimed is:

1. A computer-implemented method for verifying an electronic device user, the method comprising the steps of:
    issuing at least one action instruction comprising a liveness challenge to an electronic device user using a notification mechanism of the electronic device;
    recording response data from a plurality of data acquisition systems of the electronic device, the response data pertaining to the user's response to the at least one action instruction;
    processing the response data to form classification scores, including identifying, from the response data, the likelihood of at least one characteristic pattern associated with an action instruction, comprising:
        processing video data to assess a classification score of at least one characteristic motion associated with the action instruction by:
            performing a plurality of head pose estimations on the video data,
            processing the plurality of head pose estimations to form extracted pose information, including: extracting a series of angles from the plurality of head pose estimations; fitting a function to the series of angles; constructing a feature vector from parameters of the function, the fitting of the function, and the head pose estimations; and testing if the video data contains at least one characteristic motion with the feature vector, and
            forming a facial action classification score using the extracted pose information;
    combining the classification scores to form a classification value; and
    verifying the user when the classification value satisfies a threshold.
2. The method of claim 1, wherein at least one action instruction comprises an audio liveness challenge and a motion liveness challenge.
3. The method of claim 1, wherein the plurality of data acquisition systems comprises a first data acquisition system and a second data acquisition system, wherein the first data acquisition system is different from the second data acquisition system.
4. The method of claim 1, wherein the step of processing the response data to form classification scores comprises assessing a quality score for at least one data type.
5. The method of claim 4, wherein the at least one data type comprises video data and, wherein assessing a quality score for video data takes into account at least one of:
    frame resolution; video frame rate; colour balance; contrast; illumination; blurriness; presence of a face; and glare.
6. The method of claim 4, wherein the at least one data type comprises audio data, and wherein assessing a quality score of audio data takes into account at least one of:
    sampling frequency; background noise; and quality of the sound recording equipment.
7. The method of claim 1, wherein combining the classification scores to form a classification value comprises weighting each classification score by a quality assessment relating to a relevant data type.
8. The method of claim 7, wherein weighting each classification score by the quality assessment relating to the relevant data type comprises:
    weighting a classification score relating to video data with a quality score for video data; and
    weighting a classification score relating to audio data with a quality score for audio data.
9. A non-transitory computer-readable medium comprising executable instructions for performing the method of claim 1.
10. A computer comprising a processor configured to execute executable code stored in memory, wherein the executable code comprises instructions for performing the method of claim 1.
11. The method of claim 1, wherein processing video data to assess the classification score of at least one characteristic motion associated with the action instruction comprises performing visual speech recognition on the video data.

* * * * *